United States Patent [19]
Kashyap

[11] Patent Number: 5,305,403
[45] Date of Patent: Apr. 19, 1994

[54] OPTICAL WAVEGUIDE AND METHOD OF MAKING AN OPTICAL WAVEGUIDE

[75] Inventor: Raman Kashyap, Ipswich, England

[73] Assignee: British Telecommunications public limited company, London, England

[21] Appl. No.: 862,757

[22] PCT Filed: Dec. 7, 1990

[86] PCT No.: PCT/GB90/01917

§ 371 Date: Jun. 24, 1992

§ 102(e) Date: Jun. 24, 1992

[87] PCT Pub. No.: WO91/09338

PCT Pub. Date: Jun. 27, 1991

[30] Foreign Application Priority Data

Dec. 7, 1989 [GB] United Kingdom ............... 8927697

[51] Int. Cl.[5] ................................................ G02B 6/34
[52] U.S. Cl. ..................................... 385/37; 385/122; 385/123; 385/129; 359/332
[58] Field of Search ............... 385/11, 14, 27, 28, 385/37, 122, 123, 129, 142; 359/326, 328, 332; 372/6, 21, 19, 20, 32

[56] References Cited

U.S. PATENT DOCUMENTS

| | | | |
|---|---|---|---|
| 4,911,516 | 3/1990 | Palfrey et al. | 385/37 |
| 4,964,134 | 10/1990 | Westbrook et al. | 372/45 |
| 5,018,814 | 5/1991 | Jannson et al. | 385/28 |
| 5,166,940 | 11/1992 | Tumminelli et al. | 372/6 |

OTHER PUBLICATIONS

Journal of the Optical Society of America B: Optical Physics, vol. 6, No. 3, Mar. 1989, (Woodbury, NY, US), R. Kashyap: "Phase-matched periodic electric-field-induced second-harmonic generation in optical fibers", pp. 313–328.

Electronics Letters, vol. 25, No. 23, Nov. 9, 1989, F. Ouellette: "Phase-matching of optical fibre photorefractive intermodal couplers in infra-red", pp. 1590–1592.

Electronics Letters, vol. 24, No. 14, Jul. 7, 1988, M. E. Fermann et al: "Frequency-doubling by model phase matching in poled optical fibres", 894–895.

Topical Meeting on Non Linear Guided Wave Phenomena. Physics and Applications Feb. 2–4, 1989, Houston, US, Technical Digest Series, vol. 2, 1989, (New York, US), R. Kashyap: "Photo-induced enhancement of second harmonic generation in optical fibres", pp. 255–258.

Conference On Lasers And Electro-Optics, May 1987, OSA/IEE Digest of Technical Papers, pp. 274–275.

Hill et al., "CW Three Wave Mixing in Single Mode Optical Fibres", J. Appl. Phys. vol. 49, No. 10, pp. 5098–5106, Oct. 1978.

Osterberg et al., Digest of XIV International Quantum Electronics Conference (OSA), Paper WBB2, pp. 102, 1986.

Osterberg et al., Dye Laser Pumped By Nd:YAG Laser Pulses Frequency . . . , Optics Letts, vol. 11, No. 8 pp. 516–518, 1986.

Primary Examiner—Frank Gonzalez
Attorney, Agent, or Firm—Nixon & Vanderhye

[57] ABSTRACT

An optical waveguide in which the rate of change with wavelength of the reciprocal of the difference between the effective refractive indices of a fundamental wavelength mode and a second harmonic wavelength mode is zero at a first wavelength, and there is an internal periodic grating providing phase matching in the wavelength region of the first wavelength.

10 Claims, 3 Drawing Sheets

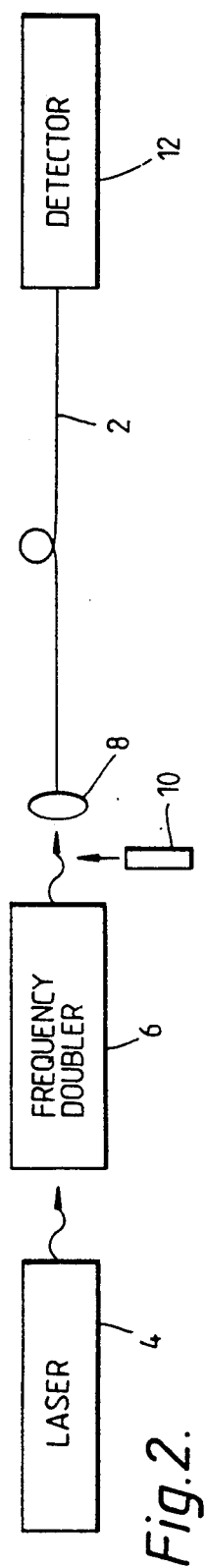
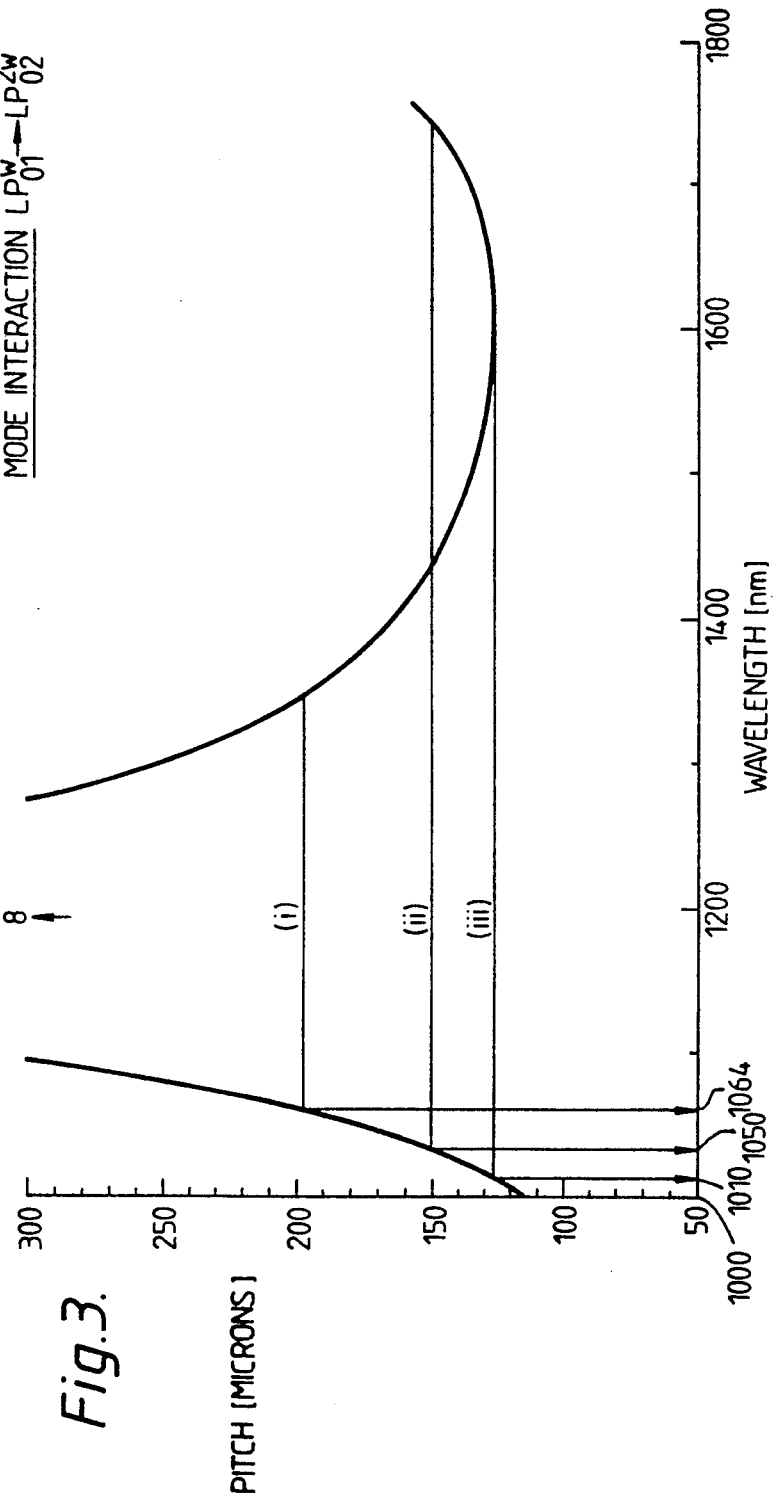
Fig.2.
Fig.3.

OPTICAL WAVEGUIDE AND METHOD OF MAKING AN OPTICAL WAVEGUIDE

BACKGROUND OF THE INVENTION

1. Field of the Invention

This invention relates to optical waveguides, and in particular to optical waveguides having an internal grating for phase matching through mode dispersion for a pair of fundamental and second harmonic wavelength modes. The present invention also relates to a method of making such optical waveguides.

2. Related Art

Waveguided nonlinear optics has grown rapidly since the laser was invented. Most postulated phase-matching techniques for frequency mixing have been demonstrated in bulk media and refinements peculiar to waveguides have been exploited in many different configurations. Phase-matching in second-harmonic generation refers to the condition when the fundamental wavelength and the generated second-harmonic wavelength fields propagate in a material in such a direction that both experience the same refractive index. The most recent interest has been in the applications of periodic structures for phase-matching. Although phase-matching to radiation modes of a waveguide can allow the use of the largest second-order nonlinear tensor coefficient in materials, the only known practical technique for phase-matching guided-waves in frequency mixing experiments uses periodic structures. In this respect periodic structures offer the most elegant phase-matching technique for use with waveguides. The confined optical fields with their correspondingly high intensities propagated over long lengths can be exploited optimally.

The scheme for phase-matching based on the use of periodic structures has been known in nonlinear optics for over 20 years. It has been theoretically shown that if the sign of the second-order nonlinear susceptibility was reversed at exactly the coherence length $l_c$, at which point the 'free-wave' and 'bound' wave get out of phase, then the effects of dispersion can be compensated, and the material is artificially phase-matched. It is also known that by modulating the refractive index in a spatially periodic fashion a similar result can be achieved, albeit less efficiently. The principle of periodic phase-matching can be understood in the following way. As the fundamental wavelength field propagates through a nonlinear material it generates a second-harmonic wavelength polarisation field which travels at the same velocity as the fundamental wavelength field and is referred to as the 'bound' wave (being bound to the fundamental wavelength field). The radiated field at the second-harmonic wavelength is referred to as a 'free' wave and travels at a phase velocity determined by the refractive index at the second-harmonic wavelength. The 'free' and 'bound' waves interfere and periodically exchange energy after an accumulated phase difference of $n\pi/2$ (where n is an integer). A $\pi/2$ phase difference is accumulated in a distance of a coherence length. If the phase of the bound wave were changed by $\pi/2$ every coherence length the 'free' wave could be made to grow rather than interferring destructively. The periodic change in the sign of the nonlinear coefficient in the fibre changes the phase of the frequency doubled 'bound' wave and therefore gives rise to 'periodic' or 'quasi phase-matching'.

Recently, an interesting phenomenon was discovered by Hill et al who noted (see Hill K. O., Kawasaki B. S., Johnson D. C. and MacDonald R. I., "CW three wave mixing in single mode optical fibres" J Appl Phys, 49(10), 5098–5106, October 1978) that optical fibres could frequency double light when pumped with high power-densities despite being centro-symmetric. This effect was then investigated by Osterberg and Margulis W. (see: a) Digest of XIV International Quantum Electronics Conference (OSA), Paper WBB2, pp102, Washington DC, 1986; and b) "Dye laser pumped by Nd:YAG laser pulses frequency doubled in glass optical fibre", Optics Letts, 11,516–518, 1986) who showed that not only was the fibre capable of frequency-doubling, but that the frequency-doubled light grew with time to levels of a few percent of the pump power. This observation could only occur if the process was phase-matched. It was later postulated to be achieved through a periodically written second-order susceptibility, $X^{(2)}$, grating which had a wave-vector equivalent to the momentum mismatch between the pump and the frequency doubled light.

This self-seeded quasi-phase matching (and equivalent externally seeded) scheme in optical fibres is wavelength sensitive and the sensitivity to frequency doubling rapidly tails off at wavelengths longer than 1064 μm for germania doped silica fibres.

SUMMARY OF THE INVENTION

According to the present invention an optical waveguide is provided in which the rate of change with wavelength of the reciprocal of the difference between the effective refractive indices of a fundamental wavelength mode and a second harmonic wavelength mode is zero at a first wavelength, and there is an internal periodic grating providing phase matching in the wavelength region of the first wavelength.

The periodic grating may have a pitch which provides phase matching at a second and a third wavelength, one being shorter and the other being longer than the first wavelength.

A particularly useful choice of periodic grating is one which provides phase matching at the first wavelength as this allows phase-matching so that wavelength mixing is possible for ultrashort, e.g. femtosecond, pulses which have a broad frequency spectrum, and other broadband sources.

The present invention is applicable to any optical waveguide in which periodic structures are usable for phase matching. The invention is expected to find particular application with optical fibre waveguides, especially those doped to provide enhanced sensitivity to the formation of the phase matching grating, for example germania doped silica optical fibres. It is a photosensitive material capable of self-organisation which thereby provides a mechanism for internal and external seeding schemes. Optical fibres are of interest as they are compatible with telecommunication systems fibres and readily confine power over large distances.

Clearly, a desirable choice of first wavelength is one which falls in an optical window of the waveguide, for example an infra-red window of silica-based optical fibres.

A method of making such a grating, according to a further aspect of the invention, includes the step of forming the periodic grating by coupling an optical signal into the waveguide of a pump wavelength and a seeding wavelength at which wavelengths the waveguide is sensitive to the formation of such a grating.

However, as noted above, the process of second harmonic generation in optical fibres is generally limited to fundamental wavelengths not much longer than 1 micron. High conversion efficiency (order 10°/o) has been reported at 1064 nm in $GeO_2$: doped silica fibres. However frequency doubling at longer wavelengths such as 1319 nm have shown very poor results. This appears to be related to a photo-excitation process.

This limitation can be overcome by forming an internal periodic grating by writing with a wavelength at which the optical waveguide is photo-sensitive such that the pitch also provides phase matching for frequency doubling at a longer wavelength at which the optical waveguide is not photosensitive.

BRIEF DESCRIPTION OF THE DRAWINGS

The various aspects of the present invention will now be described, by way of example only, with reference to the accompanying drawings of which:

FIG. 2 is a schematic diagram of apparatus for forming an optical waveguide according to the present invention;

FIG. 3 is a graph of the dispersion of the phase matching period as a function of the fundamental wavelength for the mode interaction;

DETAILED DESCRIPTION OF THE EXEMPLARY EMBODIMENTS

Figure 1:
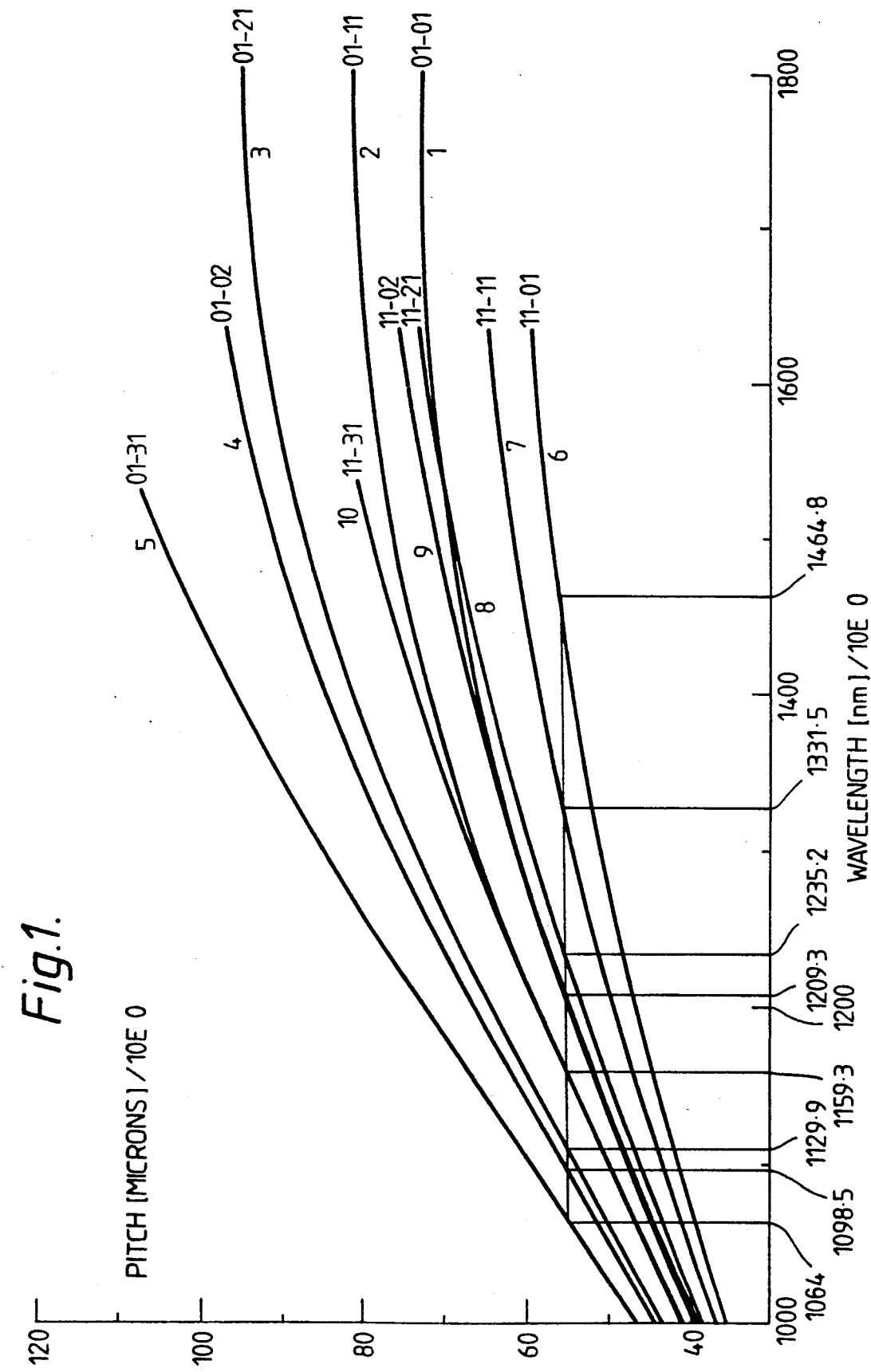
FIG. 1 is a graph of the dispersion of the phase matching period as a function of wavelength.

Phase-matched periodic-electric-field induced second harmonic generation has been experimentally demonstrated and coherence lengths of mode interactions directly measured in fibres with small core-cladding index differences, $\Delta n$. R. Kashyap has reported in an article titled "Phase-matched periodic electric-field-induced second-harmonic generation in optical fibres" Vol 6 No. 3, March 1989, J. Opt. Soc. Am B pp 313 to 328, at Table 4, that two interactions for a particular optical fibre, namely $LP_{01}^{\omega} \rightarrow LP_{01}^{2\omega}$ and $LP_{11}^{\omega} \rightarrow LP_{21}^{2\omega}$ have approximately the same period at the same wavelength. In these fibres, phase matching was not possible through mode dispersion since the core-cladding refractive index difference $\Delta n < \delta n$ (chromatic dispersion). The coherence lengths measured have the same half-periods of gratings self-written in optical fibres in the self or externally seeded frequency doubling phenomenon. It has been shown that different mode-interactions have identical coherence lengths but at different fundamental wavelengths. To further illustrate this observation, the dispersion of the phase matching period ($2 \times$ coherence length, $l_c$), as a function of wavelength is shown in FIG. 1 for a fibre with a core-cladding index difference, $\Delta n = 0.0045$, and a core radius of 5.5 $\mu$m.

It is apparent that the interaction marked 5 (mode interaction $LP_{01}^{\omega} \rightarrow LP_{31}^{2\omega}$), has the same coherence length at 1064 nm, as modes $LP_{01}^{\omega} \rightarrow LP_{02}^{2\omega}$ at a fundamental wavelength, $\lambda$, of 1098.5 nm, for $LP_{01}^{\omega} \rightarrow LP_{21}^{2\omega}$ at 1129.9 nm, $LP_{01}^{\omega} \rightarrow LP_{11}^{2\omega}$ at 1159.3 nm, for $LP_{01}^{\omega} \rightarrow LP_{01}^{2\omega}$ 1209.3 nm, for $LP_{11}^{\omega} \rightarrow LP_{02}^{2\omega}$ at 1209.3 nm, for $LP_{11}^{\omega} \rightarrow LP_{21}^{2\omega}$ at 1235.2 nm, for $LP_{11}^{\omega} \rightarrow LP_{11}^{2\omega}$ at 1331.5 nm, and for $LP_{11}^{\omega} \rightarrow LP_{01}^{2\omega}$ at 1464.8 nm. This shows that a periodic structure capable of phase matching the $LP_{01}^{\omega} \rightarrow LP_{31}^{2\omega}$ interaction at 1064 nm will also automatically phase match all the other mode interactions but at different wavelengths. The observations of a particular mode interaction will of course be governed by the overlap integral of the modes and the symmetry of the nonlinearity.

Consider, referring to FIG. 2, that a germania doped silica fibre 2 is to be phasematched at a long wavelength at which it is not photosensitive, for example 1064 nm with the mode interaction could be $LP_{01}^{\omega} \rightarrow LP_{02}^{2\omega}$. The fibre 2 will then have an internally written grating capable of phase matching $LP_{11}^{\omega} \rightarrow LP_{01}^{2\omega}$ as well but at a wavelength of 1314.8 nm.

A method of preparing the fibre 2 is as follows. A Nd:YAG laser 4 providing about 1 kW of IR optical power at 1064 nm is passed through a KTP frequency doubler 6, the resultant mix of 532 nm and 1064 nm optical signals being coupled to the fibre 2 by a lens 8. The grating takes about 5-10 minutes to form.

The efficiency may be monitored by placing a filter 10 to block the 532 nm signal entering the fibre 2 and locating a detector 12 to receive any 532 nm signal generated by SHG.

A tunable laser source may be employed to give flexibility in seeding. Also external seeding methods may be used to form the internal grating.

It is known that mode dispersion can allow phase matching between specific modes by designing a fibre with the appropriate core radius and $\Delta n$. We can consider the case of a fibre in which $\Delta n \geqq \delta n$, so that phase matching through mode dispersion is possible for at least a pair of fundamental and second harmonic wavelength modes at some wavelength greater than the wavelength at which internal gratings can be written efficiently (e.g. 1064 nm). The scheme allows the grating to be written at one wavelength and read at another. The dispersion of the phase matching period as a function of the fundamental wavelength for the mode interaction is shown in FIG. 3 for a fibre with a $\Delta n = 0.04$ and a core radius of 1.6 $\mu$m. Phase matching is possible in this fibre at a wavelength of approximately 1172 nm. There are three areas of interest marked (i), (ii) and (iii) in FIG. 3. For (i), the coherence length at 1064 microns is the same as at a fundamental wavelength of ~1350 nm. The line marked (ii) shows that there are two fundamental long wavelengths (1425 nm and 1750 nm) with the same coherence length as the preparation wavelength of approximately 1050 nm. Finally (iii) shows broadband phase matching around 1600 nm, when the fibre is prepared at approximately 1010 nm.

Gratings which provide phase matching at 1050 or 1010 nm also provide phase matching in the region of 1600 nm at which the rate of change with wavelength of the reciprocal of the difference between the effective refractive indices of a fundamental wavelength mode and a second harmonic wavelength mode is zero at a first wavelength, and there is an internal periodic grating providing phase matching in the wavelength region of the first wavelength. In the former case matching occurs at ~1600 nm, in the latter case at a second and a third wavelengths (1425 nm and 2750 nm) either side of the minima at ~16000 nm.

Figure 4:
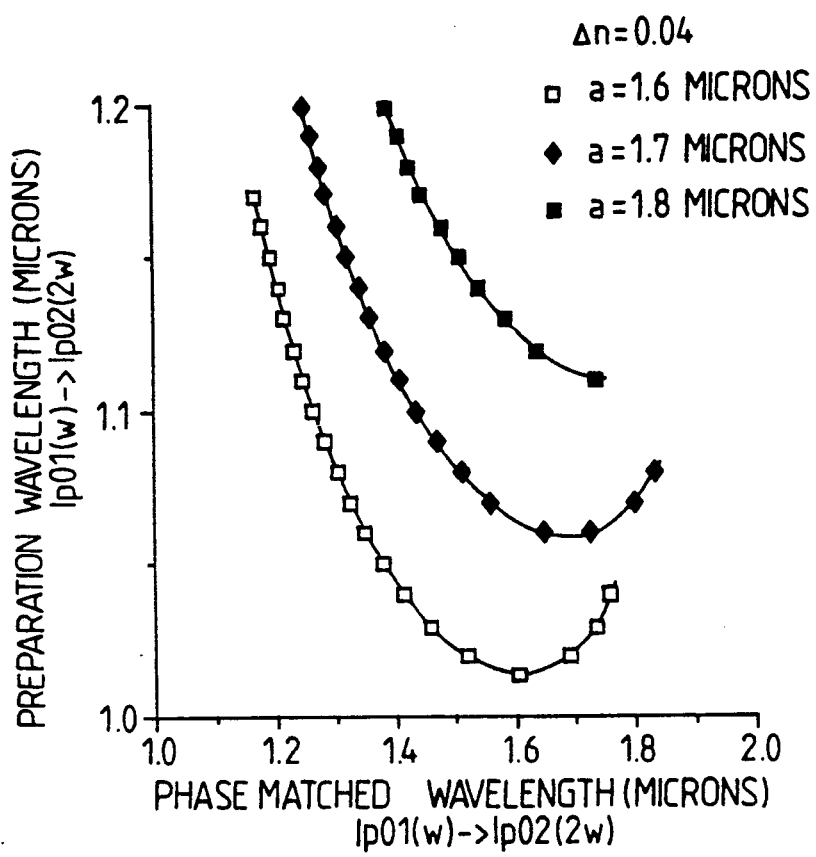
FIG. 4 is a graph of the phase matched wavelengths for optical fibres of three different core radii.

FIG. 4 shows the phase matched wavelengths for three different core radii, but the same $\Delta n$, as a function of the preparation wavelength. Assuming that it is possible to prepare fibres at a maximum wavelength of 1200 nm, second harmonic generation is possible anywhere in the communications wavelength region. note that increasing the core radius shifts both the preparation and phase match wavelength to longer wavelengths. Also of interest is the point at 1172 nm preparation wavelength where the fibre is phase matched through its mode-dispersion. Reading and writing wavelengths converge to the same value at this point. It should also be noted that both the writing and reading mode combinations remain the same in this scheme. It is not possible to use the two lowest order modes in this method for phase matching, since these modes cannot be phase matched by using mode dispersion, unless the waveguide has substantial birefringence. The most useful combination would be $LP_{01}{}^{\omega} \rightarrow LP_{02}{}^{2\omega}$ since the overlap integral of the modes is good. By using a fibre with a $\Delta n$ of 0.04 and a core radius of approximately 1.68 $\mu m$, it should be possible to phase match near the broad band phase matching wavelength around 1600 $\mu m$, having first prepared the fibre at 1064 nm.

Figure 5:
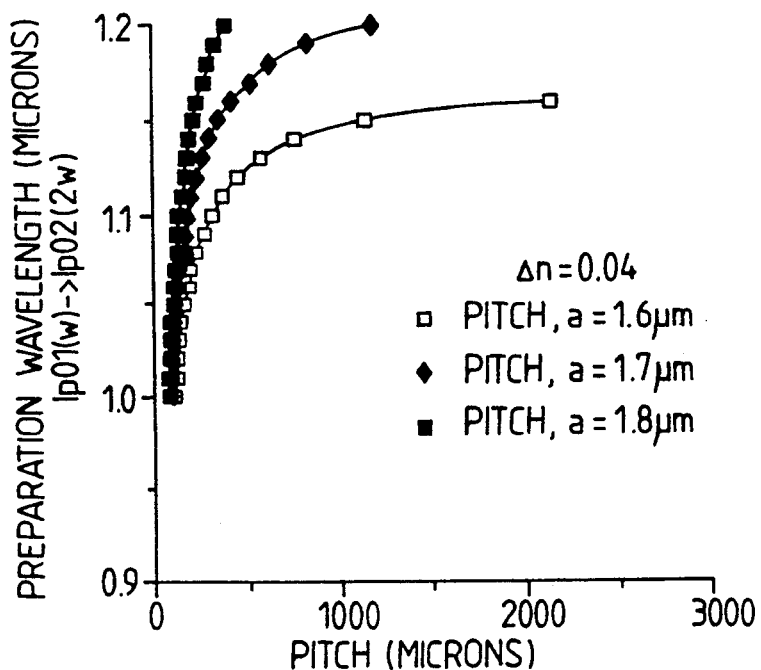
FIG. 5 is a graph of the period of the grating as a function of the preparation wavelength for the three optical fibres of FIG. 3.

FIG. 5 shows the period of the grating as a function of the preparation wavelength for the three fibres in FIG. 4. Although the grating period varies over a large range, the phase matching scheme remains unaffected.

TABLE 1

| Writing mode combination | | Reading mode combination | | Observation possible |
|---|---|---|---|---|
| long λ mode | short λ mode | long λ mode | short λ mode | |
| 1p01 | 1p01 | 1p01 | 1p01 | yes |
| | | | 1p11 | no |
| | | | 1p21 | no |
| | | | 1p02 | yes |
| | | | 1p31 | no |
| 1p01 | 1p11 | 1p01 | 1p01 | yes |
| | | | 1p11 | yes |
| | | | 1p21 | yes |
| | | | 1p02 | yes |
| | | | 1p31 | no |
| 1p01 | 1p21 | 1p01 | 1p01 | no |
| | | | 1p11 | yes |
| | | | 1p21 | yes |
| | | | 1p02 | no |
| | | | 1p31 | |
| 1p01 | 1p02 | 1p01 | 1p01 | yes |
| | | | 1p11 | no |
| | | | 1p21 | no |
| | | | 1p02 | yes |
| | | | 1p31 | no |
| 1p01 | 1p31 | 1p01 | 1p01 | no |
| | | | 1p11 | no |
| | | | 1p21 | |
| | | | 1p02 | |
| | | | 1p31 | yes |

Apart from phase matching, the overlap integral of interacting modes and the symmetry of the nonlinearity determines how efficient the frequency doubling process will be. Since the $LP_{On}{}^{\omega}$ can couple to $LP_{om}{}^{2\omega}$ modes, all such interactions at other wavelengths will also be allowed, irrespective of the combinations of m and n. For example, if a fibre is prepared in the mode combination $LP_{01}{}^{\omega} \rightarrow LP_{02}{}^{2\omega}$, the overlap integral for $LP_{01}{}^{\omega} \rightarrow LP_{01}{}^{2\omega}$ at the phase matched long wavelength will also be finite. The mode selection rules depend on a number of parameters including the mode field distribution and the induced non-linearity distribution, for example. Our tentative projection for the mode selection rules are summarised in Table 1 which show the writing and reading mode combination selection rules based on overlap integrals of the modes.

Optical waveguides according to the present invention may also be used for broadband parametric generation by pumping at a short wavelength in order to generate a broadband signal at twice the wavelength.

I claim:

1. An optical waveguide in which the rate of change with wavelength of the reciprocal of the difference between the effective refractive indices of a fundamental wavelength mode and a second harmonic wavelength mode is zero at a first wavelength, and there is an internal periodic grating providing phase matching in the wavelength region of the first wavelength.

2. A waveguide as claimed in claim 1 in which the periodic grating provides phase matching at a second and a third wavelengths, one being shorter and the other being longer than the first wavelength.

3. A waveguided as claimed in claim 1 in which the periodic grating provides phase matching at the first wavelength.

4. An optical waveguide as claimed in claim 1 in which the waveguide is substantially insensitive to optical seeding of the periodic grating at the first wavelength.

5. A waveguide as claimed in claim 1 in which the optical waveguide comprises an optical fibre.

6. A waveguide as claimed in claim 4 in which the first wavelength lies within an optical window of the waveguide.

7. A waveguide as claimed in claim 6 in which the waveguide is a germania doped, silica based optical fibre and the optical window lies in the infra-red.

8. A waveguide as claimed in claim 7 in which the optical fibre has a $\Delta n$ of about 0.04 and a core-radius of about 1.6 $\mu m$ and the periodic grating provides phase matching at about 1600 nm.

9. A method of making an optical waveguide in which the rate of change with wavelength of the reciprocal of the difference between the effective refractive indices of a fundamental wavelength mode and a second harmonic wavelength mode is zero at a first wavelength, there is an internal periodic grating providing phase matching in the wavelength region of the first wavelength, and the waveguide is substantially insensitive to optical seeding of the periodic grating at the first wavelength, said method including:

forming the periodic grating by coupling an optical signal into the waveguide of a pump wavelength and a seeding wavelength at which wavelengths the waveguide is sensitive to the formation of such a grating.

10. A method of making an optical waveguide in which the rate of change with wavelength of the reciprocal of the difference between the effective refractive indices of a fundamental wavelength mode and a second harmonic wavelength mode is zero at a first wavelength, there is an internal periodic grating providing phase matching in the wavelength region of the first wavelength, and the waveguide is substantially insensitive to optical seeding of the periodic grating at the first wavelength, said method in which the first wavelength lies within an optical window of the waveguide, the waveguide is a germania doped, silica based optical fibre and the optical window lies in the infra-red, the optical fibre has an $\Delta n$ of about 0.04 and a core-radius of about 1.6 $\mu m$ and the periodic grating provides phase matching at about 1600 nm, said method including:

forming the periodic grating by coupling an optical signal into the waveguide at about 1010 nm.

* * * * *